United States Patent Office 2,708,636
Patented May 17, 1955

2,708,636

TREATMENT AND PARTIAL DEHYDRATION OF FOODSTUFFS UNDER VACUUM

Eugene J. Rivoche, Washington, D. C.

No Drawing. Application January 26, 1952,
Serial No. 268,459

3 Claims. (Cl. 99—221)

This invention relates to the treatment and partial dehydration of foodstuff and particularly to a method whereby the foodstuff may be thoroughly cooked in a short period of time under conditions such that the vitamins thereof are not destroyed, and the taste, flavor and color characteristics of the foodstuff are preserved to a maximum extent.

The primary object in the cooking of a food product is to bring about a softening of the product, and particularly the cellulosic or other fibrous structure thereof, so that it is more palatable and more readily masticated and digested, and has a less irritating effect on the intestines. In some instances the cooking has other objects, such as the elimination of volatile oils and other constituents which affect the taste of the food product in an undesirable manner; and, in the case of food products having a high albumin content, for example, meats, fish and eggs, the coagulation of the albumins.

Proper color, taste, flavor, consistency and temperature are five factors which are considered necessary for food acceptance.

The elimination of volatile oils and other constituents which adversely affect the taste of the food product and the coagulation of the albumins, may all be accomplished by heat, but heat alone will not of itself bring about a softening of the food product. The softening of the food product and the fibrous structure thereof is obtained to a great extent by the bombarding and bursting action of the steam molecules on the food cells as the water within the product is converted into steam during the cooking process.

From the foregoing it will be understood that the term "cooking," or its equivalent, as used herein, means the subjecting of the food product to a sufficiently high temperature to transform at least a portion of the water content into steam to bring about a softening of the food product and the fibrous structure thereof by the bombarding and bursting action of the steam molecules. It may also include the elimination of constituents which adversely affect the taste of the product, or the coagulation of albumins, or both.

Since many vitamins and color, taste, or flavor constituents of foods are destroyed or adversely affected both by heat and the leaching action of boiling water, the primary object of the present invention is to bring about a complete and thorough cooking of the foodstuff throughout the whole thickness thereof at a temperature sufficiently low that such constituents of the food product will not be affected, or affected to the least possible extent, and under conditions such that desirable constituents of the food product are not leached out during the cooking operation, so that a cooked food product of high quality is obtained. In accordance with the present invention, this is accomplished by cooking the foodstuff in a gaseous atmosphere, that is, without submerging it in a cooking liquid which would leach out vitamins and other desirable constituents during the cooking operation, and by cooking the foodstuff under a sufficiently high vaccum that the desired bombarding and bursting action of the steam molecules on the food cells is obtained at a temperature so low that the vitamins, color, taste and flavor constituents are not appreciably affected, but sufficiently high to bring about the desired sterilization and killing of undesirable enzymes, microbes, etc.

Since a vacuum is the most perfect insulator, the application of heat to the foodstuff while it is maintained in a vacuum in the usual way would require a long period of heating to bring the food to the desired cooking temperature. Therefore, a further and important feature of my invention is to subject the foodstuff, during the cooking operation, to di-electric heating, usually with high frequency current, so that the foodstuff itself is used as resistance element to the current passing therethrough, thus rapidly raised to the desired cooking temperature, that is, the temperature of the boiling point of the moisture of the foodstuff at the particular vacuum to which the foodstuff is subjected.

If the foodstuff were maintained in a sealed evacuated vessel when subjected to the di-electric heating, the transformation of the moisture of the foodstuff into steam and its liberation from the foodstuff would soon destroy the vacuum and build up a superatmospheric pressure which would defeat the objects of the invention. Hence, it is necessary that the vessel in which the cooking is conducted be connected to a pumping system which will maintain the desired vacuum throughout the cooking operation.

Since the temperature attained by the foodstuff during the cooking operation will be a function of the degree of vacuum maintained in the cooking vessel, the degree of vacuum will be accurately controlled so that the temperature of the foodstuff will be maintained at that desired for the particular foodstuff being cooked. This will vary with different food products, as well as for the length of time it is desired to subject the food to the cooking treatment. For many food products a vacuum corresponding to a boiling point of water of the order of 80° C. and a cooking period of from 2 to 5 minutes will be adequate. Some food products, such as those having a high cellulose content may require longer periods of cooking, but many foodstuffs may be cooked in even less time, some in periods of less than one minute. Also, with some foodstuffs, a higher vacuum, for example, one corresponding to a boiling point of water at 75° C.; or a lower vacuum, for example, one corresponding to a boiling point of water at 90° C. or 95° C., may be used. But for any particular foodstuff the cooking temperature and the duration of the cooking operation must be such as to bring about a desired softening of the foodstuff as well as the desired sterilization, etc., thereof.

By heating the whole mass of the food product by di-electric heating while it is under a controlled vacuum, a very intense transformation of the water molecules of the foodstuff to steam throughout the whole product is obtained and the physical bursting and destructive action of the steam molecules on the cell walls, fibers, cellulose skeletons, and other hard parts of the food product and a ready disruption of them is obtained. This is of great importance for the whole group of vegetables, meats and fish.

The amount of heat generated in the foodstuff during the cooking operation preferably is automatically and electrically controlled so that a constant heating of the product and a constant flashing of the moisture content of the foodstuff into steam are obtained. Thus, as the water evaporates and the product becomes drier and less conductive, more current will be applied to maintain the heating and evaporation constant.

The present method of cooking under vacuum with di-electric heating, as above described, enables food products to be fully cooked throughout the whole mass thereof in a very short period of time, while at the same time obtaining a very soft and juicy product. This is due to the phenomena that with di-electric heating, where the food product itself is used as the resistance element to produce the heat, the desired heating of the product can be obtained almost instantaneously. This is in contrast to methods of heating where the heat is applied from the outside and has to penetrate from the outside to the center of the foodstuff, while the surface of the foodstuff is constantly being subjected to the cooling effect of the evaporation of moisture therefrom. Thus, the method described herein enables a much faster cooking of foodstuffs at temperatures below the boiling point of water, than if the same product were cooked at the same temperature by normal cooking methods. As the cooking is obtained at temperatures which have little or no adverse effect upon the vitamins, taste, color, flavor, etc., constituents of the foodstuff, a cooked product of higher quality results, and the cost is less than in cooking operations in which the foodstuff is subjected to prolonged heating.

In some cases it may be desirable to subject the foodstuff while being di-electrically heated intermittently to different degrees of vacuum, or intermittently to vacuum and a pressure equal to or above atmospheric pressure. In such cases, the foodstuff will be heated to a predetermined temperature below that at which the contained vitamins, taste, flavor and color characteristics are destroyed or adversely affected at the higher pressure and then suddenly subjected to a lower pressure, such as a vacuum corresponding to a boiling point of 40° C., at which the moisture within the foodstuff will suddenly flash into steam. Such flashing of the moisture within the foodstuff into steam materially assists in the destruction of the fibrous structure and the resulting softening of the foodstuff. For this purpose an apparatus similar to that disclosed in my copending application Serial No. 214,732, filed March 9, 1951, may be used. The intermittent subjecting of the foodstuff to repeated changes of pressure to bring about the flashing of contained moisture may continue through any part or the entire cooking of the foodstuff.

From a physiological and nutritional point of view, the method described herein of cooking foodstuffs under vacuum with di-electric heating enables large groups of food products to be cooked at temperatures appreciably below the boiling point of water, and in very short periods of time. As a result, the adverse consequences of subjecting the foodstuff to such temperatures for prolonged periods, such as the destruction of vitamins and desirable enzymes, and undesirable changes in color, taste and flavor factors are obtained in a matter of a few minutes, or less, when normal cooking at atmospheric pressure would require hours.

I claim:

1. The method of treating and partially dehydrating solid foodstuffs which comprises subjecting the foodstuff in a gaseous zone of sub-atmospheric pressure to di-electric heating, such di-electric heating being of such intensity that internal moisture of the foodstuff is flashed into steam and in escaping from the foodstuff exerts a bombarding and bursting action on the food cells which at least partially destroys the fibrous structure and softens the foodstuff, the pressure in said zone of sub-atmospheric pressure during such heating of the foodstuff corresponding to the boiling point of water below 95° C. so that said flashing of the internal moisture of the foodstuff into steam is accomplished at a sufficiently low temperature that the vitamins, color, taste and flavor constituents of the foodstuff are not appreciably affected.

2. The method of treating and partially dehydrating solid foodstuffs as set forth in claim 1 in which the pressure in said zone of subatmospheric pressure corresponds to the boiling point of water between 75° and 90° C. so that at least partial sterilization and killing of undesirable enzymes and microbes are obtained.

3. The method of treating and partially dehydrating solid foodstuffs as set forth in claim 1 in which after the foodstuff has been heated in said zone of subatmospheric pressure, the pressure in said zone is repeatedly raised and lowered.

References Cited in the file of this patent

UNITED STATES PATENTS

| | | |
|---|---|---|
| 2,091,263 | Ball | Aug. 31, 1937 |
| 2,382,033 | Supplee et al. | Aug. 14, 1945 |
| 2,564,579 | Parmenter et al. | Aug. 14, 1951 |
| 2,590,580 | Schiavone | Mar. 25, 1952 |